(No Model.)
J. L. WOODBRIDGE.
SYSTEM OF ELECTRICAL DISTRIBUTION.
No. 584,029. Patented June 8, 1897.
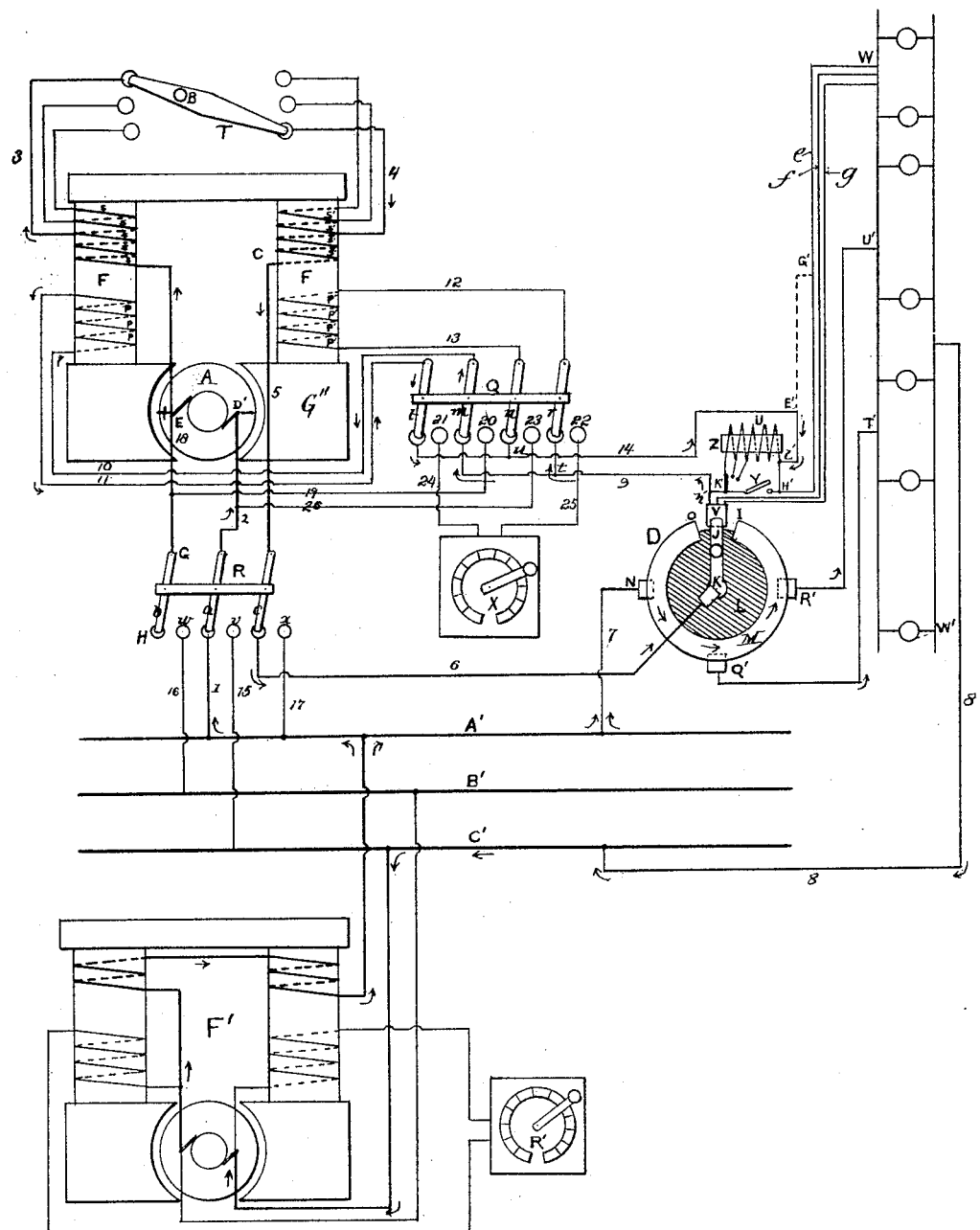
WITNESSES:
INVENTOR

UNITED STATES PATENT OFFICE.

JOSEPH LESTER WOODBRIDGE, OF BROOKLYN, NEW YORK.

SYSTEM OF ELECTRICAL DISTRIBUTION.

SPECIFICATION forming part of Letters Patent No. 584,029, dated June 8, 1897.

Application filed November 13, 1895. Serial No. 568,840. (No model.)

*To all whom it may concern:*

Be it known that I, JOSEPH LESTER WOODBRIDGE, residing at Brooklyn, in the county of Kings, State of New York, have invented certain new and useful Improvements in the System of Electrical Distribution commonly known as the "booster" system, of which the following is a specification.

My invention relates to those systems of electrical distribution in which one or more generators or other sources of electromotive force supply energy to the bus-bars at the generating-station at a constant potential, from which bus-bars the energy is conveyed to the consumption-circuits by means of feeders, one or more of which feeders are arranged to receive current at a potential greater than that of the bus-bars by means of an auxiliary generator or "booster" whose armature is connected in series between bus-bar and feeder.

The principal objects of my invention are, first, to provide suitable and comparatively inexpensive means for enabling a generator to be used either as a constant-potential machine for supplying energy to the bus-bars or as a booster in series with a feeder or with any one of a number of feeders, thus avoiding the expense of installing a number of separate generators where one would suffice, and, second, to overcome the disadvantageous effects of saturation of the field-magnets of a generator operating as a booster, so that the voltage developed in the machine shall vary more nearly in proportion to the current flowing over the feeder to which it is connected, and hence to the loss of voltage in said feeder.

My invention consists in the combinations and improvements hereinafter described and claimed.

The accompanying drawing is a diagram of the apparatus by which my invention may be practiced.

A is the armature of the generator, arranged for use as a constant-potential machine or as a booster.

F F are the field-magnets.

S S S and S' S' S' constitute the series windings and P P and P' P' the shunt-winding when the machine is connected as a compound-wound constant-potential generator. The switch T regulates the number of coils in the circuit of the series winding. In the position shown three coils on each field-magnet are in circuit. By throwing the handle B downward one or two additional coils on each side may be thrown into circuit and the potential of the machine thus increased to adapt it to the loss on a feeder whose resistance is greater.

The switch R in the position shown connects the machine as a booster, connecting the negative dynamo-brush D' with the positive bus-bar A' and the terminal of the series coil C with the feeder to be "boosted" through the feeder-switch D, the direct connection E G from the positive dynamo-brush being disconnected at H. When the switch R is thrown to the right, the generator will be connected up to the bus-bars as a constant-potential machine, the negative brush being connected to the negative bus-bar C', the terminal C of the series coil with the positive bus-bar A', and the positive brush E with the equalizing bus-bar B'.

The switch Q in the position shown connects the two portions of the shunt-winding P P and P' P' in parallel with each other and with the resistance U, which resistance is introduced into one of the three conductors which constitute the feeder shown at V W. The resistance of U may be varied by the switch K', which controls the number of coils in circuit. When the switch Q is thrown to the right, it connects the two portions of the shunt-winding P P and P' P' in series with each other and to the dynamo-brushes for constant-potential service, and the field-rheostat X is then thrown into circuit. The resistance U is shown wound about a soft-iron core Z, thus increasing the inductance to more nearly balance that of the field-coils P P and P' P'. When the resistance U is not in use, it may be shunted by closing the switch Y.

D is a switch consisting of a disk of insulating material L, which may be turned about its axis K, to the edge of which disk is attached the metallic strip M, which is connected by a sliding contact at N with the positive bus-bar. The terminals of the two feeders R' U' and Q' T' are also connected with this metallic strip by sliding contacts Q' and R'. There is a gap O I in the metallic strip, into which gap the metallic contact-piece J K projects, and in the position shown connects feeder V W through the switch R to the booster-terminal C.

F' is another generator connected to the bus-bars as an ordinary compound-wound constant-potential machine, and R' is its field-rheostat. Any other source or sources of electrical potential, however, may be used to supply electrical energy to the bus-bars, both when the booster-generator is in use as a booster and when it is connected as a constant-potential machine.

In the diagram the generator G'' is shown connected as a booster to the feeder V W. The current starting from the positive bus-bar A' passes along conductor 1, through blade $a$ of switch R, along conductor 2 to the negative brush D' to generator G'', thence through armature A of said generator to the positive brush E, thence through three of the series coils S and along conductor 3, through the blade of switch T, and along conductor 4 and through three of the series coils S' to the positive terminal of the generator at C, thence along conductor 5, through the blade $c$ of switch R, and along conductor 6 to the metallic contact-piece J K of switch D. Thence the current passes via contact-piece V, dividing between the three conductors $e\ f\ g$ of feeder V W to the point W, where that feeder is connected with and supplies electrical energy to the positive side of the consumption-circuit W W'. Other current from the positive bus-bar A' passes along conductor 7 via contact-piece N to the metallic strip M of switch D. Thence dividing via contact-pieces R' and Q' it passes along feeders R' U' and Q' T' to the points U' and T', where these two feeders are connected with and supply electrical energy to the positive side of the consumption-circuit. From this positive side of the consumption-circuit the current supplied by the feeders passes through the various translating devices to the negative side of said circuit and thence from the point W' along the return-conductor 8 to the negative bus-bar.

The current in the conductor $e$ of the feeder V W (the switch Y being open) divides at the point $h$, part passing through the resistance U via switch K' to the point $i$, part passing along conductor 9 to point $t$, where it again divides, one part passing via blade $m$ of switch Q along conductor 10, around shunt-coil P of generator G'', and thence via conductor 11 and blade 1 of switch Q to the point $u$, the other part passing via blade $r$ of switch Q along conductor 12 and around shunt-coil P' of generator G'', thence via conductor 13 and blade $n$ of switch Q to the same point $u$, where the two parts unite and return via conductor 14 to the point $i$, where it rejoins that portion of the current in conductor $e$, which has passed around resistance U.

The entire current carried by the feeder V W passes around the series coils S S' and the magnetizing force exerted by these coils on the magnets F will be proportional to the strength of this current. Similarly, so long as the resistances of the various circuits remain constant the amount of current passing from the point $h$ via conductor 9 and around the shunt-coils P P' and back via conductor 14 to point $i$ will be proportional to the total current carried by conductor $e$, and hence proportional to the total current carried by the feeder V W. Therefore the magnetizing force exerted by the coils P P' will also be proportional to the current carried by the feeder V W. Hence the combined magnetizing force of the series coils S S' and the shunt-coils P P' will be proportional to the current carried by the feeder V W. Now it is a well-known fact that the loss of voltage or drop on the feeder V W will be proportional to the current it is carrying. It is also a well-known fact that the voltage of a generator will be proportional to the magnetism of its fields. If, therefore, in the arrangement illustrated the resistance of the circuits and the number of coils in the windings of the field-magnets are so adjusted that with any given current on the feeder V W the voltage of the generator G'' is equal to the loss of voltage on said feeder, then will this equality hold good for any other current on said feeder, and the point W will be maintained at the same potential as the bus-bar A', provided that the magnetism of the fields continues to be proportional to the magnetizing force exerted by the coils. This is practically the case when the magnetization is small, but when the magnets become partially saturated it requires to produce a certain increase in the magnetization, more than a proportional increase in the magnetizing force. To overcome this difficulty, the resistance U may be made of such material—say copper, for example—whose resistance increases materially with an increase of temperature, and it may be made of so small a section that its temperature will increase rapidly with an increase in the current which it carries. In this way a greater proportion of the current carried by conductor $e$ will be sent around the shunt-coils P P' when that current is large, thus tending to counteract the effects of the saturation of the magnets above mentioned.

By turning the switch D until the metallic strip M is brought into contact with the contact-piece V the generator G'' will be disconnected from the feeder V W, which latter will be connected directly to the positive bus-bar A' through the metallic strip M, contact-piece N, and conductor 7. By turning D still farther, until the strip K J is brought into contact with the contact-piece R', the generator will be connected as a booster to the feeder R' U', the circuit being from positive bus-bar A' via 1 $a$ 2, negative brush D', armature A, positive brush E, series coils S 3, switch T 4, series coils S', 5, $c$, and 6 to K J, thence via R' and feeder R' U' to the consumption-circuit. In this case the switch Y should be closed, so that none of the current in the conductor $e$ will be diverted through the shunt-coils P P' of generator G'', the magnetization being produced solely by the current in the series coils S S'. In order to increase the magnetizing effect of this current, if necessary, one or two additional coils may be thrown into circuit by throwing the handle B of switch T downward. Similarly, by turning the switch D still farther the generator G'' may be connected to the feeder Q' T' as a booster, feeder R' U' being restored to its direct connection with the positive bus-bar.

When the generator G'' is to be used as a constant-potential machine supplying current to the bus-bars, the switch R and the switch Q must both be thrown to the right. The negative brush D' will now be connected to the negative bus-bar C' via conductor 2, blade $a$ of switch R, contact-point $v$, and conductor 15. The positive terminal C of generator G'' will be connected with the positive bus-bar A' via conductor 5, blade $c$ of switch R, contact-point $x$, and conductor 17. The positive brush E of generator G'' will be connected directly to the equalizing-bar B' via conductor 18, blade $b$ of switch R, contact-point $w$, and conductor 16. The circuit of the shunt field-coils may be traced from positive brush E via conductors 18 and 19, contact-point 20, and blade $m$ of switch Q, conductor 10, coil P, conductor 11, blade $l$, and contact 21 of switch Q, conductor 24 to rheostat X, returning via conductor 25, contact 22, and blade $r$ of switch Q, conductor 12, coil P', conductor 13, blade $n$, and contact 23 of switch Q and conductor 26 to the negative brush D' of generator G''.

The method of altering the potential of the booster-generator by means of the switch T and the extra coils of the windings S S and S' S', as shown, is not the only method by which that result may be accomplished in carrying out my invention. Any other method, such as altering the armature speed or shifting the brushes, may be employed.

In the illustration I have shown a method by which the shunt-winding of the booster-generator may be utilized to assist or oppose the magnetization of the field-magnets when the machine is connected as a booster by separating this shunt-winding into two parts P P and P' P' and diverting a portion of the current carried by the feeder through these two parts connected in parallel. In carrying out my invention, however, I do not confine myself to this or any other particular arrangement. When the machine is connected as a booster, the shunt-winding may be used to carry a portion of the feeder-current with all its coils in series or may be divided into any number of parts connected in parallel. It may be used in conjunction with an additional winding, or only a part of it may be used, or it may not be used at all. When the machine is used as a booster, the series winding alone may be utilized to excite the field-magnets, or it may not be used at all, the fields being magnetized wholly by the current diverted around them by resistance U. This resistance U may be so arranged that it may be increased or diminished at pleasure or may become infinite by disconnecting it, the switch Y being open, or instead of a separate resistance, as shown at U, a certain portion of one or more of the conductors constituting the feeder may be utilized, a connection, such as is shown by the dotted line E' G', being used, E' H' and the resistance U being removed and the switch Y closed. I have shown the same windings S S and S' S' arranged for use as the series winding both when the machine is used as a compound-wound constant-potential generator and when it is connected up as a series-wound booster; but two different windings may be provided for these cases.

What I claim as my invention is—

1. The combination substantially as described, of bus-bars, a feeder, a generator whose field-magnets are provided with a winding that may be used as a shunt-winding, and means for connecting said generator at pleasure either across the bus-bars as a constant-potential machine, or in series between the terminal of said feeder and the bus-bar of like polarity, and means for restoring the feeder to direct connection with the said bus-bar, when the generator is connected across the bus-bars.

2. The combination substantially as described, of bus-bars, two or more feeders, a generator and means for connecting said generator in series between the terminal of either of said feeders at pleasure and the bus-bar of like polarity, and means for restoring the feeders not so connected, to direct connection with the bus-bar.

3. The combination substantially as described of bus-bars, feeders, a generator whose field-magnets are provided with a winding that may be used as a shunt-winding and means for connecting said generator at pleasure either across the bus-bars as a constant-potential machine, or in series between the terminal of either of said feeders and the bus-bar of like polarity, and means for restoring the feeders not so connected, to direct connection with the bus-bar.

4. The combination substantially as described of bus-bars, two or more feeders, a generator whose field-magnets are provided with a winding that may be used as a series winding and means for connecting said generator as a series machine in series between the terminal of either of said feeders and the bus-bar of like polarity, and means for restoring the feeders not so connected, to direct connection with the bus-bar.

5. The combination substantially as described, of bus-bars, a feeder or feeders, a generator whose field-magnets are provided with a winding that may be used as a shunt-winding and also with a winding that may be used as a series winding and means for connecting said generator at pleasure, either across the bus-bars as a constant-potential machine, or in series between the terminal of either of said feeders and the bus-bar of like polarity as a series machine, and means for restoring the feeders when not so connected, to direct connection with the bus-bar.

6. The combination substantially as described, of bus-bars, a feeder or feeders, a generator, means for connecting said generator in series between the terminal of either of said feeders, at pleasure, and the bus-bar of like polarity, and means for adjusting the potential of said generator to the loss on the feeder to which it is connected, and means for restoring the feeders when not so connected, to direct connection with the bus-bar.

7. The combination substantially as described of bus-bars, one or more feeders, a generator whose field-magnets are provided with a winding that may be used as a shunt-winding, means for connecting said generator at pleasure either across the bus-bars as a constant-potential machine, or in series between the terminal of either of said feeders and the bus-bar of like polarity, and means for adjusting the potential of said generator, when connected in series between the terminal of a feeder and the bus-bar of like polarity, to the loss of potential on said feeder, and means for restoring the feeders when not so connected, to direct connection with the bus-bar.

8. The combination, substantially as described of bus-bars, one or more feeders, a generator whose field-magnets are provided with windings consisting of two or more sections or coils, means for connecting said generator in series between the terminal of either of said feeders, at pleasure, and the bus-bar of like polarity, and means for adjusting the potential of said generator to the loss on the feeder to which it is connected, by throwing into or out of circuit one or more of the sections or coils of the field-winding.

9. The combination, substantially as described, of bus-bars, one or more feeders, a generator whose field-magnets are provided with a winding that may be used as a shunt-winding, and also with a winding consisting of two or more sections or coils, means for connecting said generator at pleasure either across the bus-bars as a constant-potential machine or in series between the terminal of either of said feeders and the bus-bar of like polarity and means for adjusting the potential of said generator, when connected in series between the terminal of a feeder and the bus-bar of like polarity, to the loss of potential on said feeder, by throwing into or out of circuit one or more of the sections or coils of the field-winding.

10. The combination substantially as described, of bus-bars, one or more feeders, a generator whose field-magnets are provided with a winding that may be used as a shunt-winding and also with a winding that may be used as a series winding, consisting of two or more sections or coils, means for connecting said generator at pleasure either across the bus-bars as a constant-potential machine, or in series between the terminal of either of said feeders and the bus-bar of like polarity, as a series machine, and means for adjusting the potential of said generator, when connected in series between the terminal of a feeder and the bus-bar of like polarity, to the loss of potential on said feeder, by throwing into or out of circuit one or more of the sections or coils of the series winding.

11. The combination substantially as described of bus-bars, a feeder consisting of one or more separate conductors, a generator whose armature is connected in series between the terminal of said feeder and the bus-bar of like polarity, and whose field-magnets are provided with a winding connected in parallel with a suitable portion of one or more of the conductors constituting the feeder.

12. The combination substantially as described of bus-bars, a feeder consisting of one or more separate conductors, a generator whose armature is connected in series between the terminal of said feeder and the bus-bar of like polarity, and whose field-magnets are provided with a winding connected in parallel with a resistance introduced into and in series with one or more of said conductors.

13. The combination substantially as described, of bus-bars, a feeder consisting of one or more separate conductors, a generator whose armature is connected in series between the terminal of said feeder and the bus-bar of like polarity, and whose field-magnets are excited wholly or in part by a winding connected in parallel with a certain resistance variable or fixed introduced into and in series with one or more of the conductors constituting said feeder, which resistance is made of such material and of such dimensions that its resistance will increase with the increase of temperature caused in it by an increase of the current which it carries to such an extent that a sufficiently larger proportion of the whole current carried by the feeder shall pass around the field-magnets to counteract more or less exactly the falling off in the rate of magnetization due to the magnetic saturation of the field-magnets.

14. The combination substantially as described, of bus-bars, a feeder consisting of one or more separate conductors, a generator whose armature is connected in series between the terminal of said feeder and the bus-bar of like polarity, and whose field-magnets are excited either wholly or in part by a winding connected in parallel with a certain resistance variable or fixed, introduced into and in series with one or more of the conductors constituting said feeder, which resistance consists of a conductor wound around a core of iron or other magnetic material which shall render the inductance of the circuit comprising this resistance more nearly equal to that of the field-winding with which it is connected in parallel.

15. The combination substantially as described, of bus-bars; a feeder consisting of one or more separate conductors; a generator whose field-magnets are provided with a winding consisting of two or more sections or coils which, when said sections are connected in series with each other, may be used as a shunt-winding; means for connecting said generator at pleasure either across the bus-bars as a constant-potential machine, or in series between the terminal of said feeder and the bus-bar of like polarity; and means for connecting the several sections or coils of said field-winding in parallel with each other and with a suitable portion of one or more of the conductors constituting the feeder when the generator is connected in series between the feeder and the bus-bar, so that when thus connected its field-magnets shall be either wholly or in part excited by the current thus diverted from the feeder and around said coils; and means for disconnecting these coils from the feeder and from parallelism with each other and reconnecting them in series with each other and in shunt across the terminals of the generator, when the latter is connected across the bus-bars as a constant-potential machine.

16. The combination substantially as described, of bus-bars; a feeder consisting of one or more separate conductors; a generator whose field-magnets are provided with a winding consisting of two or more sections or coils which, when said sections are connected in series with each other, may be used as a shunt-winding; means for connecting said generator at pleasure either across the bus-bars as a constant-potential machine, or in series between the terminal of said feeder and the bus-bar of like polarity; and means for connecting the several sections or coils of said field-winding in parallel with each other and with a resistance introduced into and in series with one or more of the conductors constituting the feeder when the generator is connected in series between the feeder and the bus-bar, so that when thus connected its field-magnets shall be either wholly or in part excited by the current thus diverted from the feeder and around said coils; and means for disconnecting these coils from the feeder and from parallelism with each other and reconnecting them in series with each other and in shunt across the terminals of the generator, when the latter is connected across the bus-bars as a constant-potential machine.

J. LESTER WOODBRIDGE.

Witnesses:
W. H. GARRISON,
CHARLES EDWARDS WOODBRIDGE.